(12) United States Patent
Cristobal et al.

(10) Patent No.: US 7,919,323 B2
(45) Date of Patent: *Apr. 5, 2011

(54) MICROFLUIDIC FLOW DEVICES FOR DETERMINING PARAMETERS OF PHYSICAL AND/OR CHEMICAL TRANSFORMATIONS

(75) Inventors: Galder Cristobal, Singapore (SG); Armand Ajdari, Paris (FR); Mathieu Joanicot, Chatenay-Malabry (FR)

(73) Assignee: Rhodia Operations, Aubervilliers (FR)

( * ) Notice: Subject to any disclaimer, the term of this patent is extended or adjusted under 35 U.S.C. 154(b) by 18 days.

This patent is subject to a terminal disclaimer.

(21) Appl. No.: 11/922,337

(22) PCT Filed: Jun. 15, 2006

(86) PCT No.: PCT/FR2006/001361
§ 371 (c)(1),
(2), (4) Date: Jun. 30, 2009

(87) PCT Pub. No.: WO2006/134274
PCT Pub. Date: Dec. 21, 2006

(65) Prior Publication Data
US 2009/0305424 A1      Dec. 10, 2009

(30) Foreign Application Priority Data

Jun. 15, 2005 (FR) .................................. 05 06063
Sep. 9, 2005 (FR) .................................. 05 09217

(51) Int. Cl.
*G01N 33/00* (2006.01)

(52) U.S. Cl. ........................................ 436/34; 422/68.1

(58) Field of Classification Search .................. 436/34
See application file for complete search history.

(56) References Cited

U.S. PATENT DOCUMENTS

| 6,004,515 | A | 12/1999 | Parce et al. |
| 6,136,272 | A | 10/2000 | Weigl et al. |
| 6,391,622 | B1 | 5/2002 | Knapp et al. |
| 6,582,963 | B1 | 6/2003 | Weigl et al. |
| 6,599,736 | B2* | 7/2003 | McCaskill et al. ......... 435/288.5 |
| 6,637,463 | B1 | 10/2003 | Lei et al. |
| 6,705,357 | B2* | 3/2004 | Jeon et al. ..................... 141/9 |
| 6,749,814 | B1 | 6/2004 | Bergh et al. |

(Continued)

FOREIGN PATENT DOCUMENTS
EP          1391237 A2      2/2004

(Continued)

OTHER PUBLICATIONS

Song et al., "Millisecond Kinetics on a Microfluidic Chip Using Nanoliters of Reagents," J. Am. Chem. Soc. 2003, 125, 14613-14619.*

(Continued)

*Primary Examiner* — Yelena G Gakh
*Assistant Examiner* — Michelle M Adams
(74) *Attorney, Agent, or Firm* — Buchanan Ingersoll & Rooney, P.C.

(57) ABSTRACT

Operation of a microfluidic flow device includes providing a microfluidic flow device including a body and at least one flow microchannel for transferring a mixture (G; T') of at least two components being formed within the body, in which said mixture (G; T') of the at least two components is caused to flow in the flow microchannel and the mixture is analyzed in at least one derived branch ($B_1$-$B_6$).

31 Claims, 9 Drawing Sheets

U.S. PATENT DOCUMENTS

| | | |
|---|---|---|
| 6,900,021 B1 | 5/2005 | Harrison et al. |
| 7,691,331 B2 * | 4/2010 | Ajdari et al. ............... 422/100 |
| 2002/0064483 A1 * | 5/2002 | Sando et al. ............... 422/100 |
| 2002/0084185 A1 | 7/2002 | Sundberg et al. |
| 2002/0119536 A1 | 8/2002 | Stern |
| 2002/0137218 A1 | 9/2002 | Mian et al. |
| 2005/0161326 A1 | 7/2005 | Morita et al. |
| 2009/0142846 A1 * | 6/2009 | Crenshaw et al. ............ 436/34 |

FOREIGN PATENT DOCUMENTS

| | | |
|---|---|---|
| GB | 2319771 A | 6/1998 |
| WO | WO 96/04547 A1 | 2/1996 |
| WO | WO 97/04297 A1 | 2/1997 |
| WO | WO 97/21090 A1 | 6/1997 |
| WO | WO 03/052428 | 6/2003 |
| WO | WO 03/089129 A1 | 10/2003 |
| WO | WO 2005/049196 A1 | 6/2005 |

OTHER PUBLICATIONS

Zheng et al. "Screening of Protein Crystallization Conditions on a Microfluidic Chip Using Nanoliter-Size Droplets," J. Am. Chem. Soc. 2003, 125, 11170-11171.*

Engl et al. "Droplet Traffic at a Simple Junction at Low Capillary Numbers," Physical Review Letters, 2005, 95, 208304; published Nov. 11, 2005.*

Edel et al., "Microfluidic routes to the controlled production of nanoparticles", Chem. Commun., 2002, pp. 1136-1137, The Royal Society of Chemistry.

Kamholz et al., "Quantitative Analysis of Molecular Interaction in a Microfluidic Channel: The T-Sensor", Anal. Chem., 1999, pp. 5340-5347, vol. 71, No. 23.

Song et al., "A Microfluidic System for Controlling Reaction Networks in Time", Angew Chem. Int. Ed., 2003, pp. 767-772, Wiley-VCH Verlag GmbH &Co. KGaA, Weinheim.

* cited by examiner

MICROFLUIDIC FLOW DEVICES FOR DETERMINING PARAMETERS OF PHYSICAL AND/OR CHEMICAL TRANSFORMATIONS

BACKGROUND OF THE INVENTION

The present invention relates to a microfluidic flow device for determining parameters of a physical and/or chemical transformation, and also to the use of such a microfluidic flow device.

The term "transformation" is used to cover any type of interaction that may take place in a mixture of at least two components. In non-limiting manner, the transformation may be a reaction of chemical and/or physical type, such as for example, any conventional type of chemical reaction, and also crystallization or precipitation, or indeed a change in a liquid/vapor equilibrium, amongst others. In general, in the meaning of the invention, such a transformation can involve chemical phenomena, with electrons being exchanged or being shared, physical interactions or repulsions, such as hydrogen bonds, electrostatic interactions, steric attractions or repulsions, affinities for different hydrophilic and/or hydrophobic media, formulation stabilities, flocculation, or indeed phase transfers, e.g. of liquid/liquid, solid/liquid, or gas/liquid type.

In the meaning of the invention, the parameters of such a transformation are, in non-limiting manner, the rate of chemical reaction in a uniform or non-uniform medium, the conditions that enable an optimum yield to be obtained for chemical reactions, reaction enthalpies, processes over time involving chemical and physical reactions, and also solubility diagrams or phase diagrams.

In conventional manner, a microfluidic flow device comprises at least one microchannel enabling at least one fluid to flow. The characteristic dimension of each microchannel, in the context of the invention, lies in the range a few micrometers to one millimeter. Typically, such a dimension causes flow to be substantially laminar within the microchannel, having a Reynolds number of less than 1.

A microfluidic flow device is known from the article "Quantitative analysis of molecular interaction in a microfluidic channel: The T-sensor" (Anal. Chem. 1999, 71, 5340-5347) referred to below as Yager et al. That flow device comprises two upstream channels together with a single downstream channel defining a T-shape. That publication describes the possibility of causing a target fluid to flow together with a fluorescent indicator within the downstream channel so as to determine the concentration of the target fluid by measuring fluorescence in a region of said channel, in which mutual diffusion takes place between the target fluid and the indicator.

The application of a microfluidic flow device for determining parameters of a chemical type transformation is known from the article "A microfluidic system for controlling reaction networks in time" (Angewandte Chemie, International Edition 2003, 42, 767-772), which is referred to below as Ismagilov et al. The arrangement of that device involves two inlets for respective fluids that are suitable for reacting together. Those two reagents are initially put into contact with a separator fluid in order to avoid early reaction, then they are mixed with a non-miscible fluid, typically oil. That leads to dispersed entities being formed, i.e. a succession of drops, each of which comprises a mixture of the two above-mentioned reagents.

Under those conditions, when a chemical reaction occurs, each drop constitutes a microreactor, with the composition thereof varying along the microchannel. The microchannel is also provided with zigzags that contribute to deforming flow within the drops, thus making it possible to improve mixing between two reagents. The way the composition varies within each drop is measured optically, in particular by fluorescence.

Finally, the publication "Microfluidic routes to the controlled production of nanoparticles" (Chem. Commun., 2002, 1136-1137), referred to below as de Mello et al., describes the formation of nanoparticles of CdS. The corresponding reaction is tracked by absorption. That article emphasizes the fact that the microfluidic solution makes it possible in particular to improve uniformity along the reaction volume.

One of the advantages of the microfluidic solution is that it makes it possible to use only a very small quantity of fluid. Furthermore, it makes it easy to vary the composition of the mixture of the components under study, by modifying the flow rates thereof. However, the solution disclosed by Ismagilov et al. is found to be relatively unsatisfactory, in particular in that it does not make it possible to determine effectively the parameters of the transformation it sets out to study.

Furthermore, and in general, there exists a continuing need in industry to develop new products, presenting new properties, e.g. new chemical compounds or new compositions comprising new chemicals and/or new associations of chemicals. The physical and/or chemical transformations of substances are properties that are important for a good many applications, and it is often necessary to test them in research and development processing. There exists a need in terms of methods and installations for accelerating research and development processing, e.g. for testing a large number of substances and/or for performing tests on the smallest possible quantities of substances, and/or for performing tests more quickly, and/or for performing tests relating to transformations that are too slow to be studied in the device proposed by Ismagilov.

BRIEF SUMMARY OF THE INVENTION

That said, the invention seeks to remedy the above-mentioned drawbacks of the prior art. In particular, it seeks to propose a microfluidic flow device that is simple and compact in structure, and that gives satisfactory access to at least some of the parameters of a physical and or chemical transformation.

To this end, the invention provides a microfluidic flow device for determining parameters of a physical and/or chemical transformation, the device comprising a body, at least one flow microchannel for passing a mixture of at least two components formed within the body, the or each flow microchannel opening out into at least one fork enabling a tree structure to be created having a plurality of downstream branches, said tree structure being asymmetrical.

According to other characteristics of the invention:
the or each flow microchannel divides into at least two derived branches of order 1, one of which divides into at least two derived branches of order 2, at least one derived branch of order (n−1) being divided into at least two derived branches of order n, and in that n is greater than or equal to 4, and preferably greater than or equal to 7;
for each order, with the exception of the order furthest downstream, two derived branches are provided, one of which is not divided and is connected directly to an outlet, and the other of which is divided into two derived branches of immediately higher order;
for each fork the head losses between the fork in question and the various outlets to which said fork is connected, are substantially identical;

the length of the non-divided branch is twice the length of the divided branches;

the various divided branches are rectilinear and extend in line with one another;

the outlets are disposed mutually adjacent to one another;

it has a single outlet for at least some of said derived branches, and preferably for all of said derived branches;

each divided branch forms the same angle, in particular an angle of 135°, with both of the derived branches extending from said divided branch;

the derived branches form a main channel possessing meanders, some derived branches from a first meander extending in the vicinity of derived branches from an adjacent meander;

the derived branches form a succession of a plurality of substantially identical patterns;

in the vicinity of at least one fork, there is provided a link branch interconnecting the two derived branches extending from said fork;

the device further includes means for creating dispersed entities, each of which is formed by said mixture of said at least two components;

the means for creating dispersed entities comprise at least two first microchannels for delivering said at least two components, together with a microchannel for delivering a fluid that is not miscible with said components and/or with a mixture thereof, which microchannel is put into communication with said at least two first microchannels;

the means for creating dispersed entities are suitable for generating a succession of drops separated by segments of a carrier phase, while the or each link branch presents transverse dimensions such as to permit the carrier phase to pass along said link branch while preventing the drops passing in said link branch;

the link branch possesses two end portions of small cross-section, together with a middle portion of cross-section that is considerably greater than that of said end portions;

the flow microchannel is provided with means for mixing the reagents within each dispersed entity;

the device is provided with analyzer means for analyzing said mixture of said at least two components;

the analyzer means are of an optical nature, in particular a Raman analyzer, an infrared analyzer, or indeed a fluorescence analyzer;

the device includes means enabling a gradient to be imposed in at least one operating condition along at least one downstream branch; and said device includes outlets into which at least some of said downstream branches open out, and the number of outlets is greater than the number of flow microchannels.

The invention also provides a use of the device as defined above, in which said mixture of said at least two components is caused to flow in the flow microchannel and said mixture is analyzed in at least one derived branch.

According to other characteristics of the invention:

analyses are performed on said mixture in downstream branches of different orders;

the composition of said mixture is analyzed;

a mixture is caused to flow that has an unvarying initial composition;

the analysis step is used for deducing rate parameters for the transformation that takes place between said at least two components, in particular for deducing a rate constant;

the initial composition of said mixture is modified;

a gradient of at least one operating condition is applied in a plurality of downstream branches of different orders;

the appearance of crystals or of different spatial arrangements is detected in the downstream branches that are subjected to said gradient of at least one operating condition;

said detection step is used to deduce a solubility diagram or a phase diagram;

said mixture is caused to flow in the form of a succession of said dispersed entities;

the dispersed entities are drops distributed in a carrier phase;

the dispersed entities are segments of a carrier phase separated by drops; and a succession of drops and of segments of a carrier phase is caused to flow in the vicinity of said fork and of the link branch, the distance (L) between the fork and the link branch, the length ($l_g$) of a drop, and the length ($l_t$) of said segment of carrier phase being such that:

$$(l_g+l_t)/2 \leq L \leq l_g+l_t$$

BRIEF DESCRIPTION OF THE DRAWINGS

The invention is described below with reference to the accompanying drawings, given solely as non-limiting examples, in which.

DETAILED DESCRIPTION OF THE INVENTION

Figure 1:
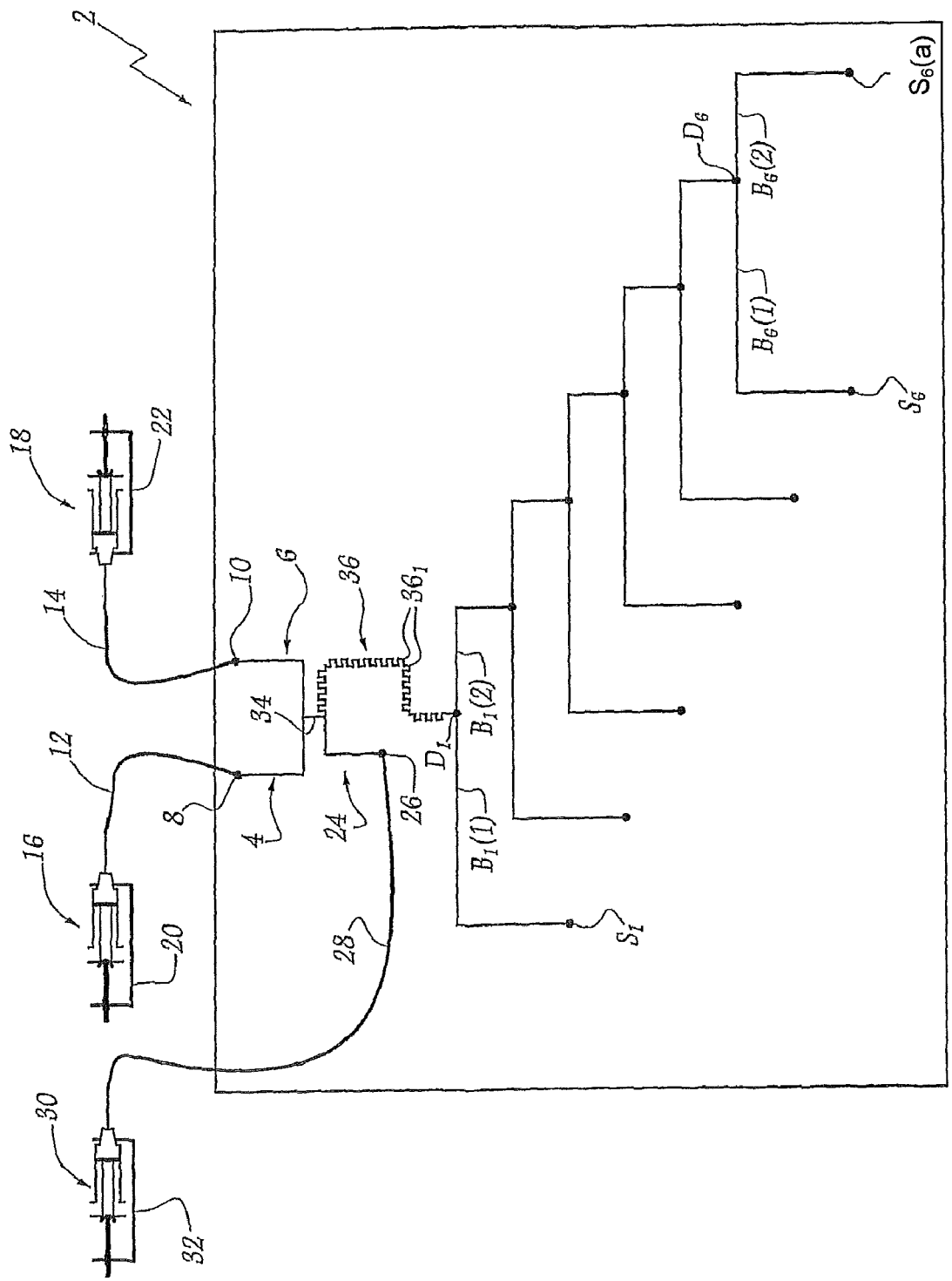
FIG. 1 is a diagrammatic face view showing a microfluidic flow device in accordance with the invention.

The microfluidic flow device in accordance with the invention that is shown in FIG. 1 comprises firstly a body 2 in the form of a plate. The plate may be made in conventional manner out of poly(dimethylsiloxane), or "PDMS". As an alternative, it is nevertheless possible to make use of some other material, such as glass, for example. Various microchannels are etched in the plate 2, likewise in conventional manner.

The plate possesses a typical length of 75 millimeters (mm), a typical width of 50 mm, and a typical thickness of 1 mm. Furthermore, the various microchannels mentioned above posses a typical section lying in the range a few micrometers to one millimeter, and in particular close to 50 micrometers (μm).

More precisely, there are firstly provided two L-shaped microchannels 4 and 6 for delivering two components. Each microchannel is associated with an inlet 8 or 10, suitable for receiving a first end of a tube 12 or 14, with the other end of the tube being connected to a syringe 16 or 18. The rate at which fluid is administered by each syringe is controlled by a syringe pusher 20 or 22.

The plate 2 also has formed therein a microchannel 24 for delivering a carrier phase. In a manner analogous to that described above, the microchannel 24 is associated with an inlet 26, a tube 28, a syringe 30, and a syringe pusher 32. The various mechanical members 8 to 22 and 26 to 32 are of known type and they are not described in greater detail below.

The two microchannels 4 and 6 join each other at an intermediate microchannel 34 shown vertically in FIG. 1 that in turn opens out into the microchannel 24, thereby enabling the carrier phase to be delivered. Downstream from this junction zone, there is thus formed a microchannel 36 referred to as a "flow" microchannel. It should be observed that this microchannel 36 is provided with a succession of bends $36_1$ that modify the internal flow of the reagents, thus enabling them to be mixed together, as described in greater detail below.

At its downstream end, the flow microchannel 36 opens out into a fork $D_1$ from which there extend two L-shaped branches. These branches are referred to as derived branches of order 1, and they are given the references $B_1(1)$ and $B_1(2)$.

It should be observed that only one of these derived branches of order 1, the branch $B_1(2)$, is in turn divided at a fork $D_2$ into two derived branches of order 2, referenced $B_2(1)$ and $B_2(2)$. In contrast, the other derived branch of order 1 $B_1(1)$ is connected directly to an outlet $S_1$.

In the same way, for each order n, one of the derived branches $B_n(1)$ is directly connected to a corresponding outlet $S_n$, while the other derived branch $B_n(2)$ divides at a fork $D_{n+1}$ into two derived branches of order (n+1). Thus, on each occasion there are only two derived branches of a given order, which branches are written $B_n(1)$ and $B_n(2)$, with n lying in the range 1 to 6.

At order 6, which corresponds to the downstream end of the network, both branches are identical, the branch $B_6(2)$ being connected to a corresponding outlet $S_6$(bis). As described in greater detail, the value of the maximum order, corresponding to that of the derived branches $B_6(1)$ and $B_6(2)$ has an influence on transit time. From this point of view, it is advantageous for the maximum order to be greater than 4, preferably greater than 7. From the above it can be seen that the device in accordance with the invention has a single flow microchannel, together with a number of outlets, said number being greater than 1, and specifically equal to (n+1), where n is the maximum order of the tree structure defined by the various derived branches.

Figure 2:
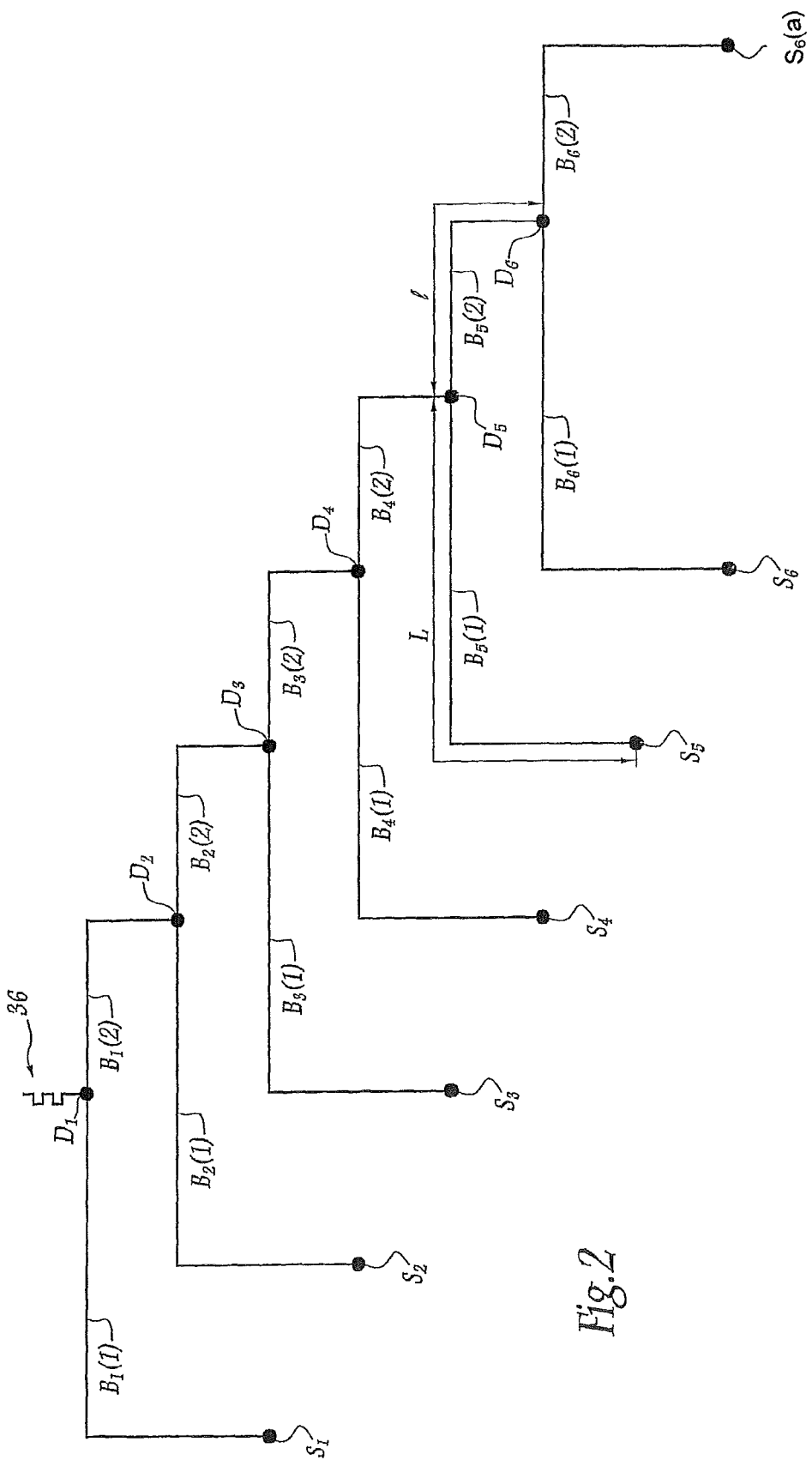
FIG. 2 is a face view showing the downstream portion of the FIG. 1 microfluidic flow device on a larger scale.

As shown in FIGS. 1 and 2, the arrangement of the various derived branches $B_1$ to $B_6$ is generally asymmetrical, in particular relative to a middle vertical axis. Nevertheless, it should be underlined that this asymmetrical character could also be obtained by varying the sizes of the channels. In other words, an arrangement can be asymmetrical in the meaning of the invention even if the various derived branches are geometrically symmetrical about the above-mentioned vertical axis, providing the flow sections of the branches of a given order are different.

It should be observed that the various derived branches in this embodiment are generally L-shaped. Thus, with reference in particular to FIG. 2, each branch presents a horizontal portion extending away from the upstream fork and extended by a vertical branch opening out into the corresponding downstream fork or outlet. It should also be observed that the various derived branches of the device are situated in a common plane, corresponding to the plane of the plate 2.

It is emphasized that the arrangement of FIGS. 1 and 2 is advantageously balanced in terms of head losses. For this purpose, each non-divided derived branch $B_n(1)$, where n=1 to 5, presents a length L, whereas each divided derived branch $B_n(2)$ presents a length l where L=2 l.

In other words, the non-divided branches are twice as long as the divided branches. It should be observed that these lengths take into account both the horizontal and the vertical portions of each branch.

Under such conditions, the head losses between firstly each fork $D_1$ to $D_6$ and secondly the or each outlet to which the fork is connected are substantially identical. Thus, for the fork $D_6$, the two head losses firstly between $D_6$ and $S_6$ and secondly between $D_6$ and $S_6$(bis) are equal. In the same manner, the three head losses respectively between $D_5$ and $S_5$, $D_5$ and $S_6$, and $D_5$ and $S_6$(bis) are substantially identical.

It should be observed, stepwise, that for $D_1$ the head losses between $D_1$ and $S_n$, where n=1 to 6, and also between $D_1$ and $S_6$(bis) are likewise identical. This technique makes it possible to balance in satisfactory manner the head losses associated with the device of FIGS. 1 and 2.

In the embodiment of FIG. 1, at each fork $D_1$ to $D_6$, the stream flows in equally distributed manner via each of the two branches that extend from the fork in question. In other words, the fluid flow rate flowing in each branch of the same order is substantially identical.

Nevertheless, by way of a variant that is not shown, it is possible to make provision for the flow rate of the fluid flowing in the non-divided branch, i.e. the branch connected directly to an outlet, to be greater than that flowing in the divided branch. As appears more clearly below, this configuration serves to further increase the transit time of the fluid flowing through the various divided branches.

Figure 3:
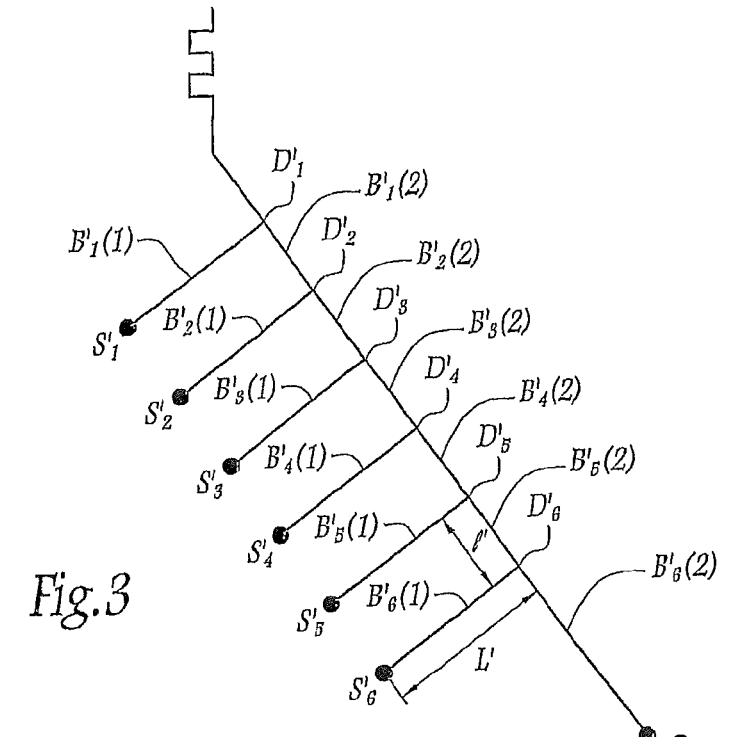
FIGS. 3 to 7 are face views analogous to FIG. 2, showing different variant embodiments of the invention.

FIG. 3 shows a variant embodiment of the installation shown in FIGS. 1 and 2. In FIG. 3, mechanical elements that are analogous to those of FIGS. 1 and 2 are designated by the same references, associated with the "prime" symbol.

The FIG. 3 installation differs from that described with reference to FIGS. 1 and 2 in that the various derived branches $B'_1$ to $B'_6$ are rectilinear. These derived branches extend obliquely, connecting a given fork either to another fork or else to an outlet. In addition, the divided branches $B'_1(2)$ to $B'_6(2)$ extend in line with one another.

As in the above example, the derived branches $B'_1(1)$ to $B'_6(1)$ that are connected directly to respective outlets $S'_1$ to $S'_6$ are of a length L' that is twice as long as the length l' of the branches $B'_1(2)$ to $B'_6(2)$ that become divided into two derived branches of higher order. The embodiment shown in FIG. 3 is advantageous in that the derived branches are particularly simple to make because of their rectilinear shape.

In a variant that is not shown of FIG. 3, the various non-divided branches $B'_1(1)$ to $B'_6(1)$ need not all extend to the same side, specifically down and to the left in FIG. 2. In this respect, these various branches that are directly connected to respective outlets may extend, for example, in alternating manner to either side of the main middle axis of the installation.

Figure 4:
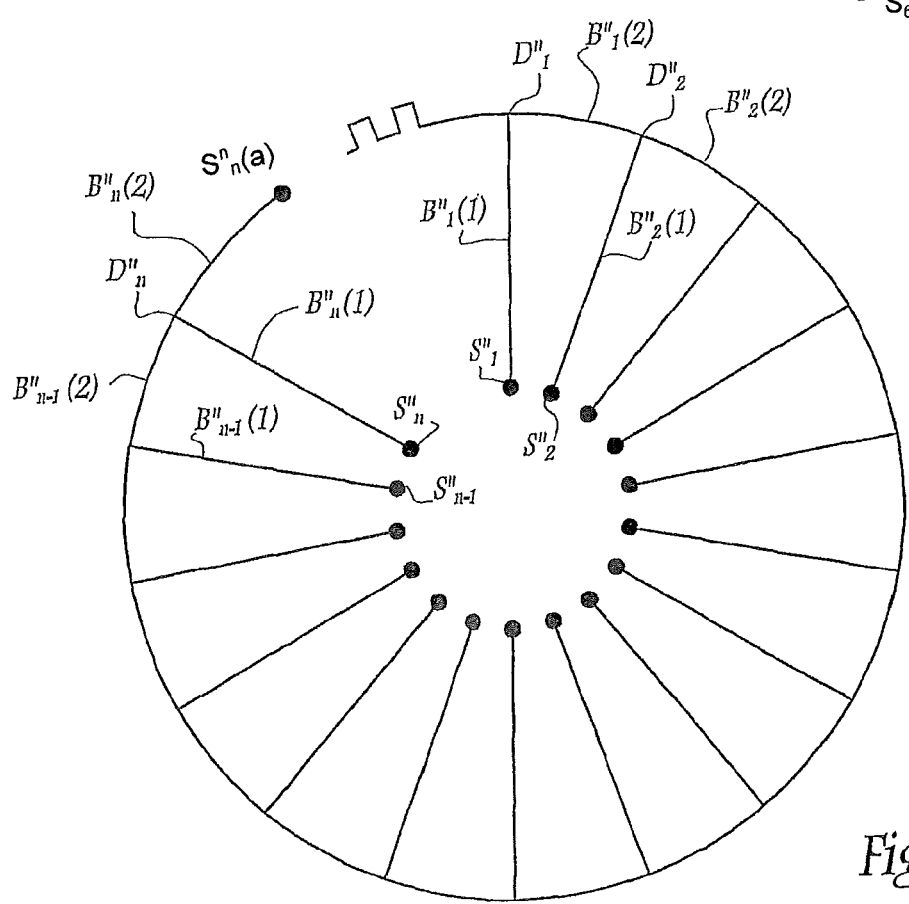

FIG. 4 shows an additional variant embodiment. In this figure, mechanical elements analogous to those of FIGS. 1 and 2 are designated by the same references, associated with the "double prime" symbol.

In FIG. 4, references $B''_1(1)$ to $B''_n(1)$ designate the various non-divided derived branches, i.e. those branches that are connected directly to respective outlets $S''_1$ to $S''_n$. These branches $B''_1(1)$ to $B''_n(1)$ are rectilinear and form portions of radii of a circle, with the outline of the circle being defined by the other derived branches that are divided and written $B''_1(2)$ to $B''_n(2)$.

Thus, in this embodiment, it should be observed that the various outlets $S''_1$ to $S''_n$ are adjacent to one another insofar as they are situated close to the center of the above-mentioned circle. In another embodiment that is particularly advantageous, but not shown, the various outlets from the derived branches open out into a single orifice. This enables a single pressure to be applied to the outlets from all of the derived branches, so that the pressure differences within these branches are completely under control.

By way of a variant of FIG. 4 that is not shown, the various rectilinear derived branches may extend, not inwards, but outwards from the circle formed by the curvilinear derived branches.

Figure 5:
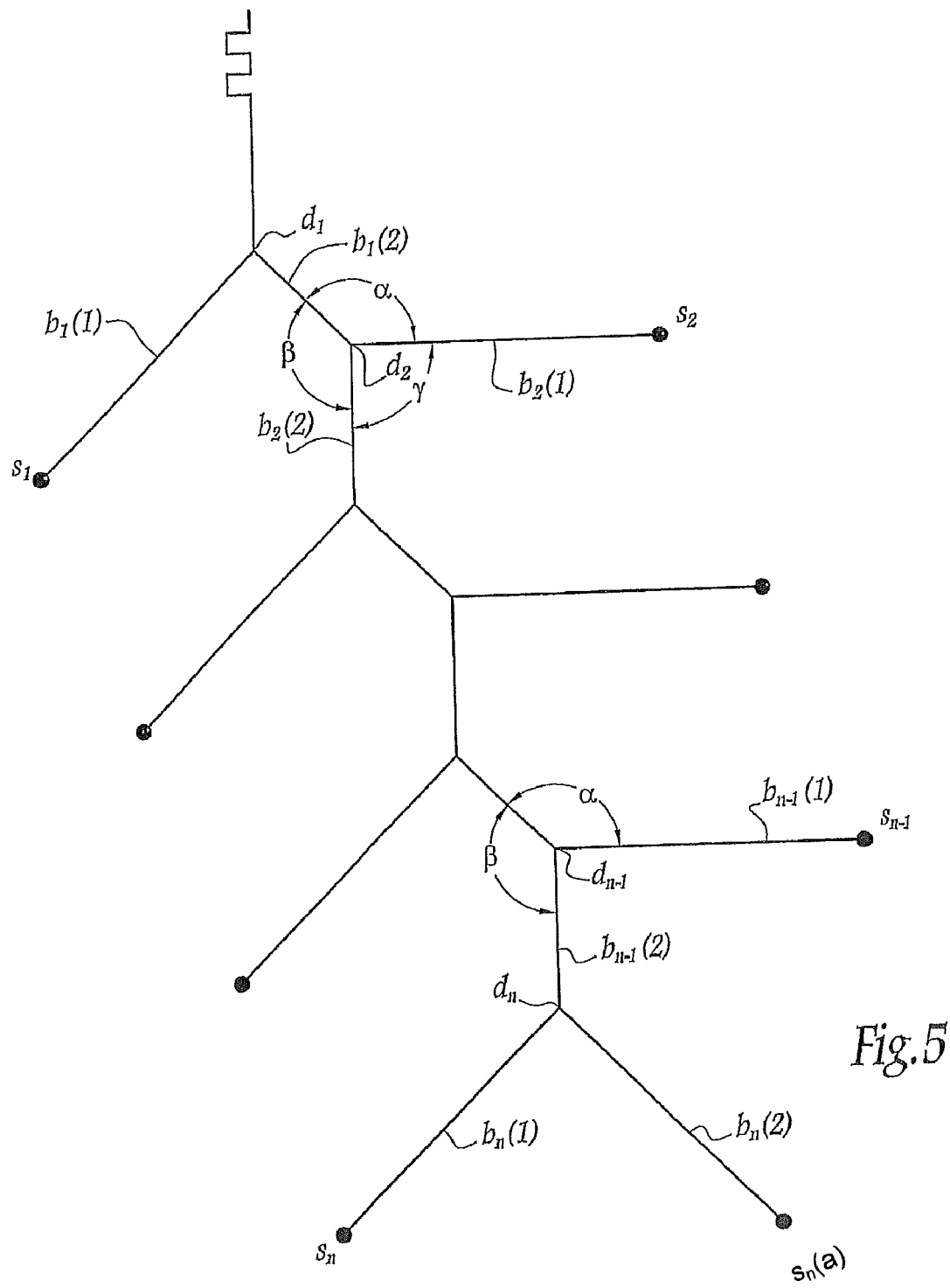

FIG. 5 shows an additional variant embodiment of the installation shown in FIGS. 1 and 2. In FIG. 5, mechanical elements analogous to those of FIGS. 1 and 2 are given the same references, with the exception that uppercase letters are replaced by lowercase letters.

In FIG. 5, $\alpha$ and $\beta$ designate the angles between each upstream divided branch $b_i(2)$, where i lies in the range 1 to (n−1), and each respective downstream branch $b_{i+1}(1)$ and $b_{i+1}(2)$. The angle between the two above-mentioned downstream branches is written $\gamma$.

In this variant embodiment, the angles $\alpha$ and $\beta$ are equal, and specifically equal to 135°, with $\gamma$ being a right angle. This configuration is advantageous since it avoids forming points of stagnation in the flow. Given that the angles $\alpha$ and $\beta$ are equal, the flow splits in particularly satisfactory manner between the two above-mentioned downstream branches, specifically without any such stagnation phenomenon.

Figure 6:
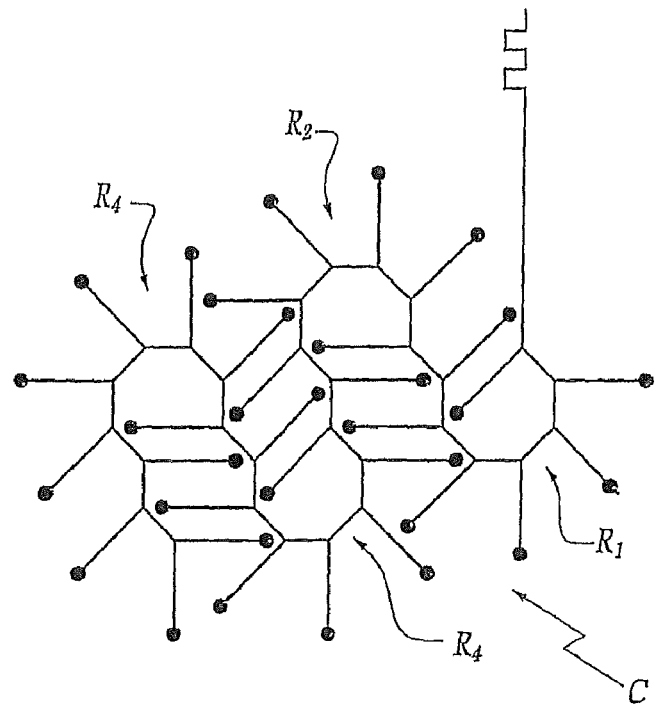

FIG. 6 consists in replicating the pattern shown in FIG. 5. More precisely, if the main channel is referenced C, as made up by the various derived branches, said channel possesses a certain number of meanders referenced $R_1$ to $R_4$.

In this respect, it can be emphasized that derived branches of a first meander extend in the vicinity of derived branches of an adjacent meander and parallel thereto. This is advantageous since it enables the overall size of the installation to be reduced.

Figure 7:
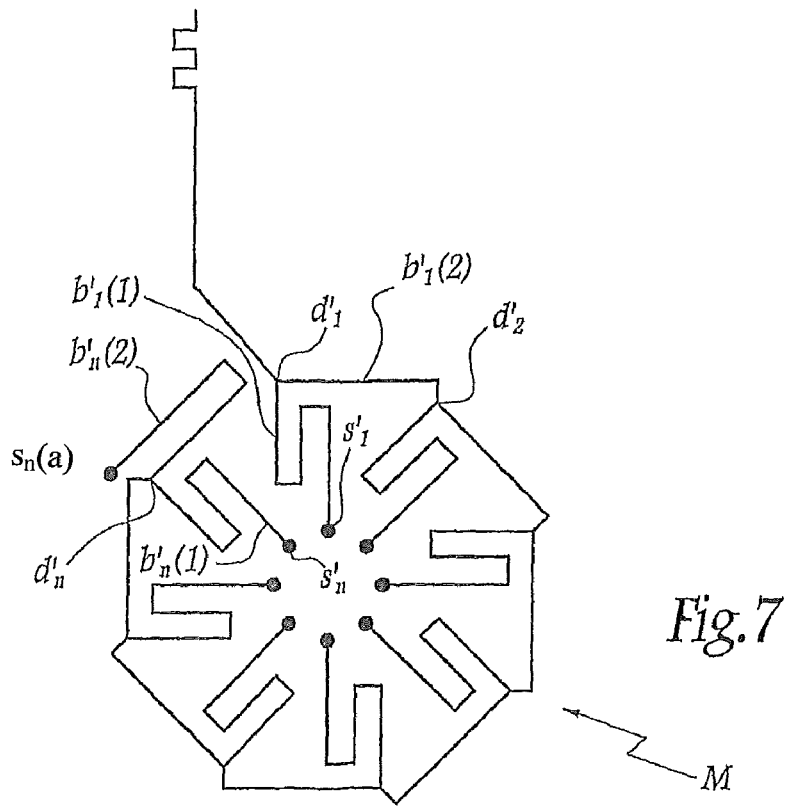

FIG. 7 shows an additional variant embodiment of the invention. In this figure, mechanical elements analogous to those of FIG. 5 are given the same references, associated with the "prime" symbol.

The tree structure formed by the various derived branches in FIG. 7 approximates more or less to a circle. Nevertheless, unlike FIG. 4, these derived branches $b'_1(2)$ to $b'_n(2)$ are rectilinear, not curvilinear, so they form chords of a circle (not shown) inscribed at the peripheries of the various branches.

Furthermore, the various outlets $s'_1$ to $s'_n$ of the non-divided branches $b'_1(1)$ to $b'_n(1)$ are provided in the vicinity of one another, as in the embodiment of FIG. 4. In this respect, it may be observed that these various outlets may open out into a single orifice, as explained above with reference to FIG. 4. Nevertheless, unlike the embodiment of FIG. 4, these non-divided derived branches are not rectilinear, insofar as they are folded over in a kind of S-shape, which is advantageous in terms of overall size.

The various branches of the FIG. 7 installation form a pattern that is generally circular and given reference M. By way of a variant that is not shown, it should be observed that the end branch $b'_n(2)$ need not be connected to the outlet $s'_n$(bis), but may be extended by other divided or non-divided derived branches, forming another pattern, analogous to the above-mentioned pattern M.

Figure 8A:
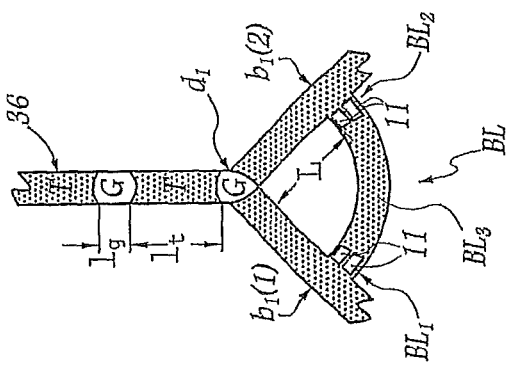
FIG. 8a is a face view showing a variant of the FIG. 5 device with the drops and the segments shown in FIG. 8 flowing therethrough.
Figure 8:
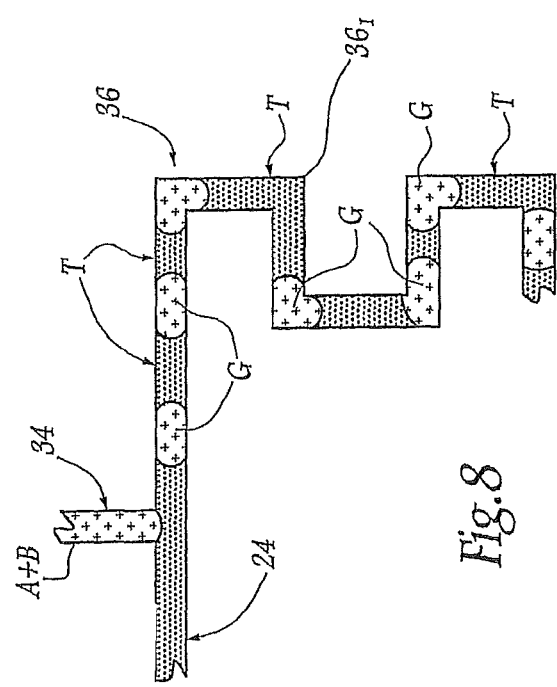
FIG. 8 is a face view on a larger scale showing the upstream portion of the FIG. 1 device in operation.

FIG. 8 shows the implementation of the device of FIGS. 1 and 2 with reference to the upstream portion thereof, i.e. as far as the downstream end of the flow microchannel 36. It should be understood that the devices shown in FIGS. 3 to 7 are implemented in analogous manner to that described below.

The inlets 8 and 10 are used to introduce two components, referenced A and B, e.g. reagents, both of which are liquid. In a variant, at least one of the two components could nevertheless be a gas.

These two components then flow along the respective microchannels 4 and 6 and then into the intermediate microchannel 34. Given the very nature of the microchannel 34, and in particular its dimensions, the two components flow therein substantially without mixing.

In the microchannel 34, mixing can occur only by molecular diffusion. Under such conditions, if the microchannel 34 is short enough, the molecules of the two components do not have enough time to diffuse, such that the flows do not interpenetrate. Nevertheless, by way of a variant that is not shown, it can be advantageous to add an inert fluid in accordance with the teaching of Ismagilov et al.

Furthermore, a liquid carrier phase is introduced via the inlet 26, which phase is not miscible with the reagents A and B. The flow rates of the two reagents advantageously lie in the range 0.1 microliters per hour (µL/h) to 1000 µL/h, while the flow rate of the carrier phase advantageously lies in the range 0.1 µL/h to 100,000 µL/h.

Given that the reagents are not miscible with the carrier phase, a succession of drops G forms downstream from the junction between the microchannels 24 and 34, which drops constitute dispersed entities, each being made up of a mixture of the two reagents A and B. Two successive drops are separated by a segment T of the carrier phase. It should be observed that when A and B are gases, then the above-mentioned dispersed entities are not drops, but bubbles.

As shown in FIG. 8, the drops G occupy the entire section of the flow microchannel 36, such that all of the components, namely the drops and the carrier phase, travel at the same speed. Within the microchannel 36, the flow is thus of the plug or piston type.

Upstream from the microchannel 36, the reagents A and B constituting each drop are mixed together very little if at all. Then, as they advance, the drops G are subjected to changes in their internal flow by the walls of the bends $36_1$ that are provided in the microchannel 36. This therefore contributes to homogenizing each drop as it travels so that, once in the vicinity of the first fork $D_1$, the reagents A and B are thoroughly mixed within each drop G.

On reading the above, it can be seen firstly that the microchannels 4, 6, and 34 form means for introducing the components, so as to form the mixture that is to flow in the tree structure defined downstream from the fork $D_1$. Furthermore, the microchannels 24 and 34, associated with the bends $36_1$ of the flow microchannel 36 constitute means for making the mixture, which means are located upstream from the fork $D_1$.

Figure 9:
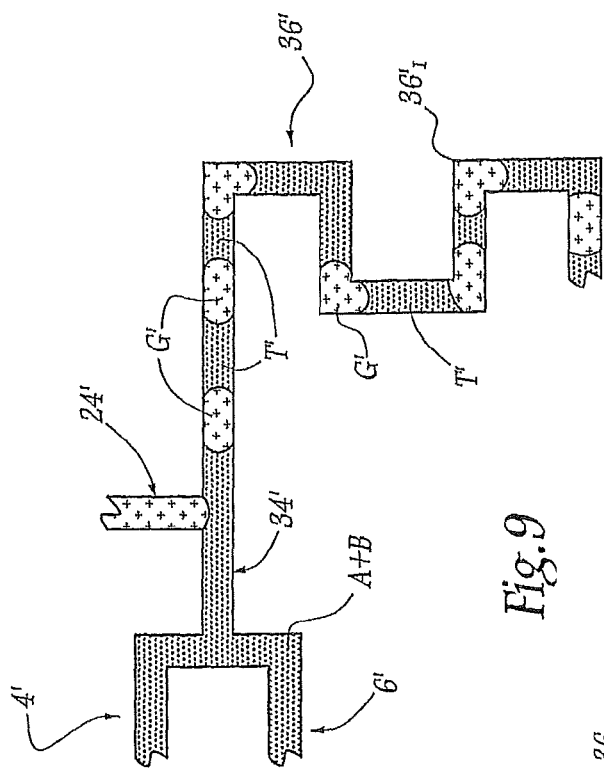
FIG. 9 is a face view, analogous to FIG. 8, showing the upstream portion of a microfluidic flow device in accordance with another variant embodiment of the invention.

FIG. 9 shows a variant embodiment of the invention. In this variant, there can be found two reagent delivery microchannels 4' and 6' that join together to form an intermediate microchannel 34'. An auxiliary fluid delivery microchannel 24' is also provided. The microchannels 24' and 34' join together to form a single flow channel 36' that is provided with bends $36'_1$.

Unlike the embodiment of FIG. 8, the two reagents A and B introduced via the microchannels 4' and 6' belong to the carrier phase. Thus, assuming that the auxiliary fluid is a liquid, a succession of drops G' forms in the flow microchannel 36', defining separate segments T' of carrier phase, each of which is formed by a mixture of the reagents A and B. As in the preceding example, these reagents A and B become mixed together along the flow microchannel 36', in particular because of the presence of the bends 36'$_1$.

In the two examples shown in FIGS. 8 and 9, it should be observed that the liquid carrier phase is the phase that best wets the walls of the flow microchannel 36 or 36'. The fact of forming dispersed entities is advantageous insofar as that enables the accuracy of the analysis that is formed downstream to be increased.

FIG. 8bis shows, on a larger scale, a variant of the embodiment of the device that is shown in FIG. 5. More precisely, it comprises an enlarged view of the upstream portion of that device, showing the flow microchannel 36, the first fork $d_1$, and the two derived branches of order 1, i.e. $b_1(1)$ and $b_1(2)$.

In the vicinity of the fork $d_1$, the two derived branches are interconnected by an additional branch referred to as a link branch and given reference BL. Advantageously, each pair of derived branches $b_i(1)$ and $b_i(2)$, where i lies in the range 2 to n in FIG. 5, is likewise provided with such a link branch. In this respect, it should be observed that such link branches can be fitted to all of the devices described with reference to the accompanying figures.

Returning to FIG. 8bis, the cross-section of the link branch BL is analogous to that of the two derived branches $b_1(1)$ and $b_1(2)$. Nevertheless, at each of its two ends, i.e. in the vicinity of its intersection with each of these derived branches, the link branch BL presents a cross-section that is significantly smaller than that of the above-mentioned derived branches.

For this purpose, two pairs of obstacle-forming studs 11 are provided in the vicinity of the intersection between the link branch BL and each of the derived branches of order 1. However, in a variant, it is, possible to envisage other means for locally reducing the cross-section of the link branch BL. Thus, by way of non-limiting example, the link branch may be provided with two bottlenecks at each of its ends.

Below, in accordance with the above description with reference to FIG. 8, it is assumed that a succession of drops G and segments T of carrier phase flow along the upstream microchannel 36 and then into the two derived branches of order 1, $b_1(1)$ and $b_1(2)$. Under such conditions, the transverse dimensions of the link branch BL, in the studs 11, are such as to allow only the carrier phase to pass through, while, in contrast, preventing the drops G from passing through.

Thus, as shown in FIG. 8bis, the link branch BL can be subdivided into three segments. Firstly there are two end segments BL$_1$ and BL$_2$ of small cross-section so as to prevent the drops G from passing. Furthermore, there is a middle portion BL$_3$ of flow section that is wider again, so as to present little hydrodynamic resistance.

The distance between the facing walls of the fork $d_1$ and the link branch BL is written L. The length of a drop is written $l_g$, and the edge-to-edge distance between two drops, i.e. the length of the segment T of the carrier phase, is written $l_t$.

When a given drop reaches the fork $d_1$, it is advantageous that the preceding drop has not yet gone past the link branch BL. Since the carrier phase is shared equally between the two derived branches, the distance between the drop reaching the fork and the drop in the vicinity of the link branch BL is equal to half the initial spacing between the drops. Under such conditions, it is therefore advantageous for L to be greater than the sum $l_g/2 + l_t/2$.

Furthermore, it is advantageous for the drops to be far enough apart from one another to limit the phenomenon of coalescence. Under such conditions, it is advantageous for there to be a single drop between the fork $d_1$ and the link branch BL in the derived branch under consideration. This corresponds to a distance L being less than the sum $l_g + l_t$.

To sum up, it is advantageous for L, $l_g$, and $l_t$ to be such that:

$$(l_g + l_t)/2 \leq L \leq l_g + l_t$$

By way of non-limiting example, if it is desired to form drops having lengths of the order of 200 μm, then the distance L is close to 450 μm.

The presence of link branches, such as BL shown in FIG. 8bis, gives rise to specific advantages.

Thus, firstly it ensures that drops are shared in satisfactory manner downstream from the fork $d_1$, i.e. it ensures that drops tend to flow in alternation along one and then the other of the derived branches. This thus serves to avoid forming trains of drops corresponding to a plurality of successive drops flowing along the same derived branch. This alternating distribution of drops ensures that the drops arrive in regular manner at the analysis points, thereby guaranteeing good quality analysis. In particular, it is possible to take averages in terms of analysis.

Furthermore, the existence of link branches serves to a large extent to avoid coalescence phenomena corresponding to two initially-separate drops coming close together and then merging. This serves to confer great accuracy to the analysis that is performed in this way by preventing any mixing between drops having different chemical histories and/or different compositions.

Finally, the presence of link branches enables all of the drops to flow through the entire microfluidic device, even when the device presents a configuration that is complex. In other words, the link branches serve to improve the supply of drops to all of the outlets of the device.

Figure 10:
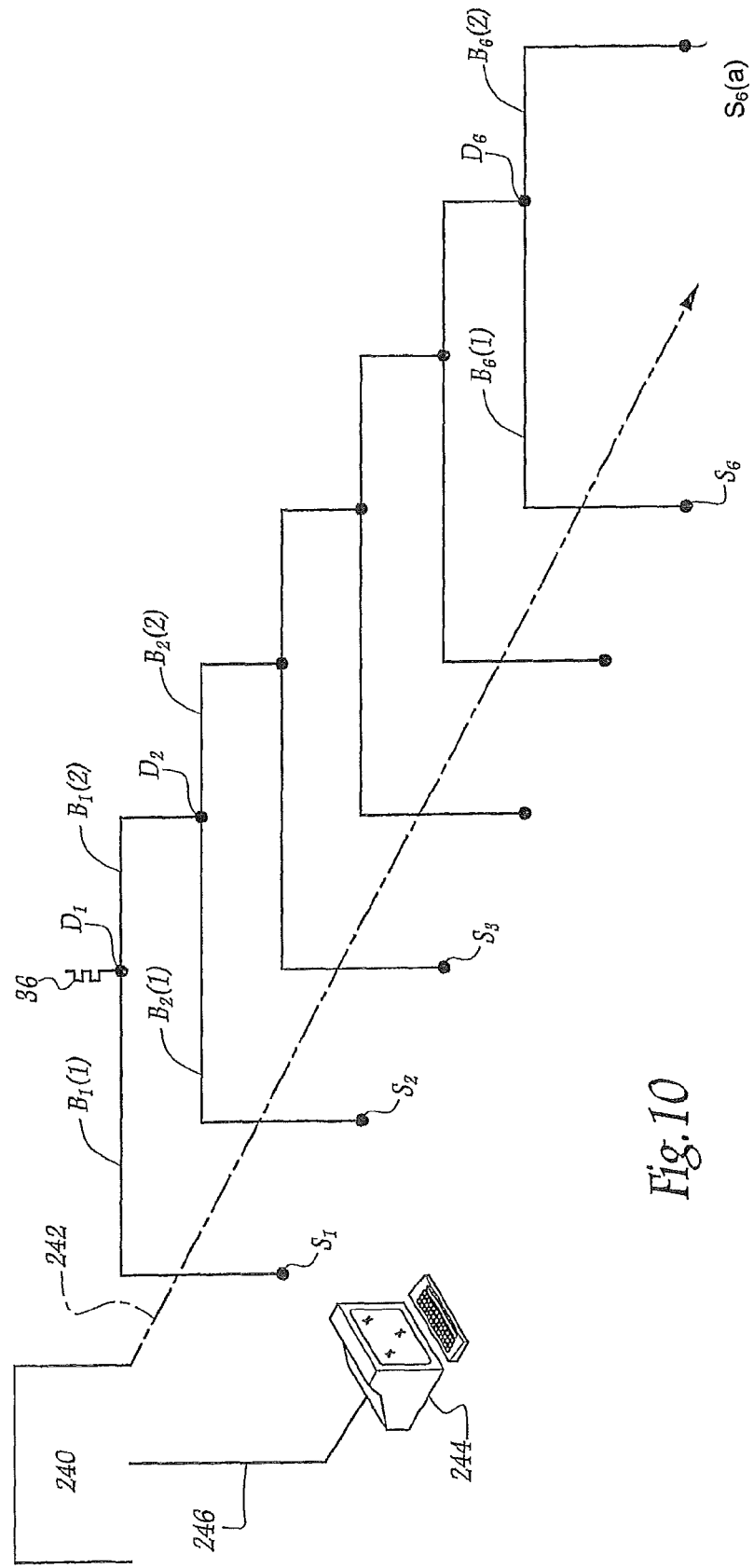
FIG. 10 is a face view showing the FIG. 2 device in operation.

FIG. 10 shows how the device of FIGS. 1 and 2 is used in its portion situated downstream from the first fork $D_1$. It is assumed that a succession of drops G, each made up of a uniform mixture to two reagents A and B, flows into the first fork $D_1$ as explained with reference to FIG. 8.

Immediately downstream from the first fork $D_1$, the various drops G are shared, with substantially half of them flowing in each of the derived branches of order 1, i.e. $B_1(1)$ or $B_1(2)$. It can thus be seen that in each of these two branches, the speed of the drops is equal to half the speed they possess in the flow microchannel 36.

In the same manner, in each derived branch of order 2, i.e. $B_2(1)$ or $B_2(2)$, the speed of the drops is divided by four compared with the speed they possess in the microchannel 36. In general, for an order n under consideration, the speed of the drops is reduced by a factor of $2^n$ compared with the speed they possess in the microchannel 36. Thus, in each derived branch of order 6, i.e. $B_6(1)$ or $B_6(2)$, the speed of the drops is one sixty-fourth of the speed in the flow microchannel 36.

The transit time of a drop between the downstream end of the flow microchannel 36 and an outlet $S_n$ is then written $t_n$. These transit times diverge in a geometric progression of ratio 2, satisfying the following equation:

$$\text{For } n > 1, \; t_n = \left\{ \sum_{i=1}^{n-1} 2^{i-1} \right\} \cdot t_1 + 2^{n-1} \cdot t_1$$

Thus, in the example of FIG. 10, a drop taken from the device via outlet $S_6$ or $S_6$(bis) has been in transit for a period that is nearly fifty times longer than a drop removed from the device via the first outlet $S_1$.

In this respect, it is emphasized that a drop leaving via $S_6$, i.e. from the downstream derived branch $B_6(1)$ has traveled a distance of about 7 L/2. This drop possesses a transit time that is about 14 times greater than a drop flowing along a channel having the same length, i.e. 7 L/2, but not including a fork.

It should also be observed that the device of the invention serves to transform time into space. More precisely, when a chemical reaction takes place between the reagents A and B, each location in the network formed by the various derived branches represents one and only one chemical reaction time.

The device of FIG. 10 further includes analysis apparatus 240, specifically apparatus of the Raman type. In operation, this analyzer 240 makes use of a laser beam 242 in known manner. It is also connected to a processing computer 244 via a line 246.

In the present example, it is assumed that the two reagents A and B react to form a compound written C. Under such conditions, the beam 242 is directed obliquely so as to analyze the various non-divided derived branches, i.e. $B_1(1)$ to $B_6(1)$. It is also emphasized that this analysis is implemented in the vicinity of the various outlets $S_1$ to $S_6$.

Under such conditions, for each outlet, the beam detects the passage of the various drops having the same composition, thus making it possible to take an average of the measurement made in this way so as to impart good accuracy thereto. In known manner, the Raman analyzer 240 measures the concentrations in C, written $C_1$ to $C_n$ in the vicinity of the various outlets $S_1$ to $S_n$, i.e. for transit times lying in the range $t_1$ to $t_n$.

Figure 11:
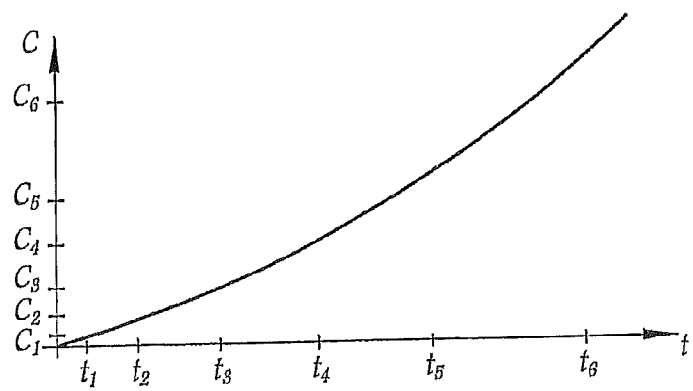
FIG. 11 is a graph obtained by implementing the microfluidic flow device of FIG. 10.

The computer 244 can then deliver the curve shown in FIG. 11 plotting variation in the concentration in C as a function of time t. There can be seen the above-mentioned concentrations $C_1$ to $C_6$, together with the transit times $t_1$ to $t_6$. In conventional manner, the curve as obtained in this way, when subjected to suitable mathematical processing, can be used to determine the rate constant $k_c$ of the reaction $A+B \rightarrow C$.

By way of a variant that is not shown, the invention can make use of analysis means that are other than the Raman analyzer mentioned above. Firstly, it is possible to envisage making use of an infrared type camera suitable for detecting the heat produced or absorbed by the reaction at the various transit times $t_1$ to $t_n$. This can be used to determine the enthalpy of the reaction under consideration.

Furthermore, when the compound C that is formed during the reaction is of the fluorescent type, then it is possible to use an analysis apparatus of the optical fluorescence type. Under such conditions, and in known manner, the measured light intensity increases as the reaction progresses.

In the example of FIG. 10, the initial composition of each drop does not vary, insofar as the respective flow rates of A and B are kept constant. As an alternative, it is nevertheless possible to envisage modifying the initial composition of each drop even before the beginning of the reaction, and assuming that the reaction is substantially instantaneous. Under such conditions, at each outlet $S_1$ to $S_6$, it is possible to sample the composition of the drops.

In other words, if the drops begin by being constituted by B, and then the concentration in A is increased progressively, then the outlet $S_1$ will correspond to an initial drop constituted substantially by component A, whereas the outlet $S_6$ will correspond substantially to an initial drop made up of component B. As a function of the various compositions measured at the outlets $S_1$ to $S_6$, this makes it possible to identify which initial percentages of A and B are the most favorable for the reaction.

Figure 12:
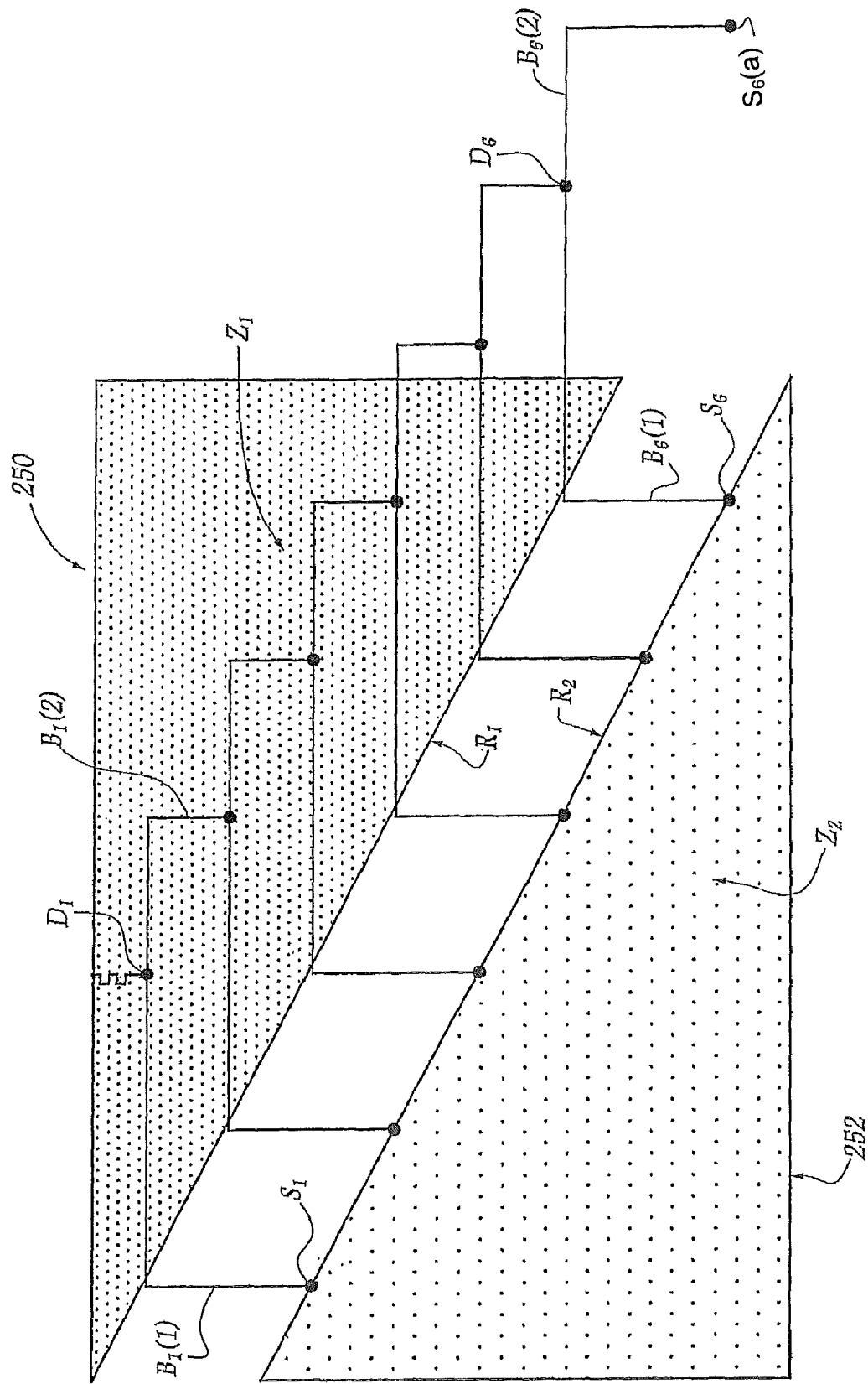
FIG. 12 is a face view analogous to FIG. 10 showing a variant embodiment of the microfluidic flow device of FIG. 10.

FIG. 12 shows the device of FIG. 10 associated with means for establishing a gradient in operating conditions, and specifically in temperature. More precisely, a heat source 250 is provided, constituted by any suitable means, specifically a tubular heat exchanger, or a Peltier effect device.

This heat source serves to maintain a substantially constant temperature in a zone $Z_1$ situated towards the top and the right-hand side of the microfluidic network, as shown in FIG. 12. More precisely, this hot zone possesses an oblique border $R_1$ that extends along the top ends, i.e. the upstream ends, of the vertical portions of the various non-divided branches, i.e. $B_1(1)$ to $B_6(1)$.

A cold source 252 is also provided, likewise implemented by any suitable means, such as a tubular heat exchanger. The cold source enables the temperature that exists in a zone $Z_2$ situated towards the bottom and the left-hand side of the microfluidic network to be maintained constant.

This zone $Z_2$ possesses in particular an oblique order $R_2$ that is situated parallel to the border of the zone $Z_1$, and extending along the outlets $S_1$ to $S_6$. In other words, this oblique border of the cold zone $Z_2$ corresponds to the bottom, i.e. downstream, ends of the various non-divided branches $B_1(1)$ to $B_6(1)$.

The respective temperatures that exist in the zones $Z_1$ and $Z_2$ are written $T_1$ and $T_2$. Typically, these temperatures possess respective values of about 5° C. and about 75° C., with the difference between these temperatures advantageously lying in the range 5° C. to 70° C.

Thus, a temperature gradient is established between the upstream and downstream ends respectively of the vertical portions of the branches $B_1(1)$ to $B_6(1)$. Under such conditions, if it is assumed that the compound B is soluble in the compound A, it is possible to obtain the corresponding solubility diagram.

Figure 13:
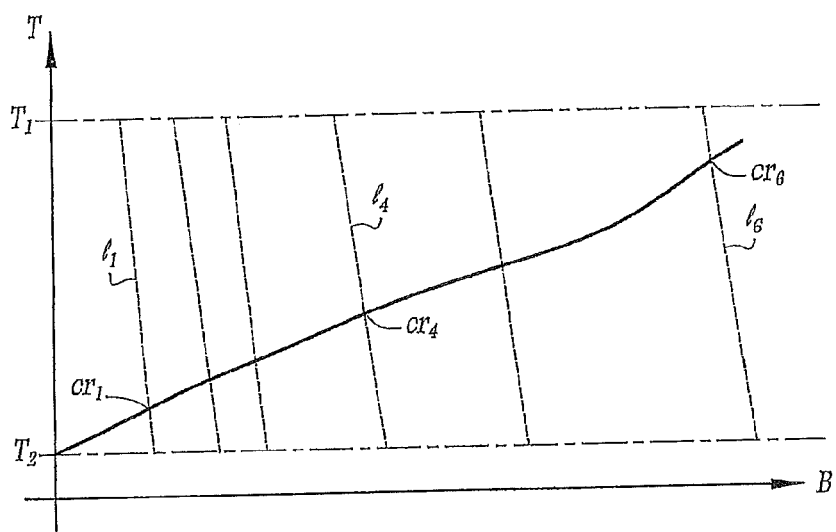
FIGS. 13 and 14 are respectively a solubility diagram and a phase diagram obtained by implementing the microfluidic flow device of FIG. 12.

This diagram is shown in FIG. 13, where the concentration in B is plotted along the abscissa while the temperature T is plotted up the ordinate. It can thus be understood that it is possible using the device of the invention to access the domain situated between the two horizontal straight lines drawn as chain-dotted lines that correspond respectively to the above-mentioned temperatures $T_1$ and $T_2$.

The dotted lines corresponding respectively to the variation in the concentration of B in each of the branches $B_1(1)$ to $B_6(1)$ are referenced $l_1$ to $l_6$. It should be observed that these lines are slightly oblique, insofar as the concentration in B increases towards the downstream ends of these branches, which is accompanied by a decrease in temperature.

Furthermore, by using suitable analysis means, e.g. a confocal Raman spectroscope, an optical microscope between crossed polarizers, dynamic light diffusion, or X-rays, it is possible to detect the appearance of crystals of B in each branch, as the temperature decreases. As a result, various points, written $cr_1$ to $cr_6$ are obtained for a curve that corresponds to the appearance of such crystals. This makes it possible to obtain the curve for crystallization of B in A.

It should be observed that it is advantageous for the hot source 250 to be disposed upstream of the microfluidic network. This serves to avoid crystals forming in the upstream zone, which might obstruct flow in the microchannels.

As a variant that is not shown, it can be assumed that the concentration in B is constant within each of the branches $B_1(1)$ to $B_6(1)$. Under such conditions, the lines $l_1$ to $l_6$ plotted on the graph of FIG. 9 no longer extend obliquely, but extend vertically.

Figure 14:
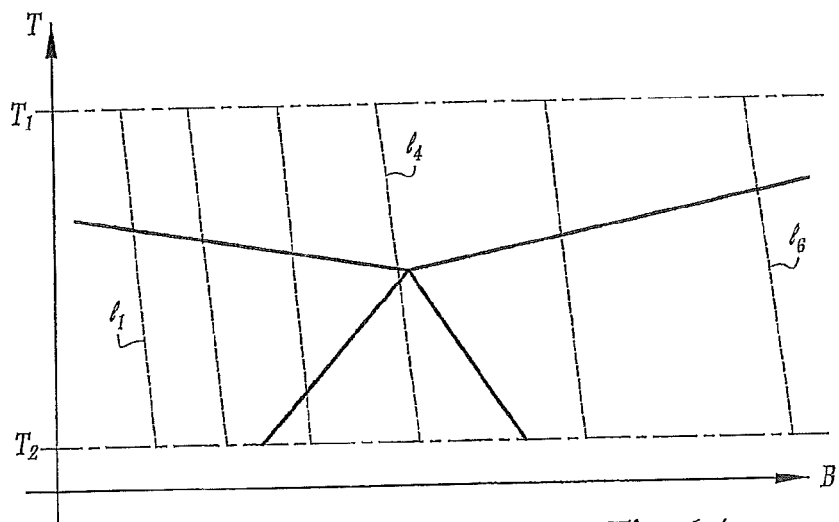

It is possible to use the device of FIG. 12 to obtain various parameters of the solubility curve of FIG. 13. Thus, the device makes it possible to obtain in particular a phase diagram between the two reagents A and B, as shown in FIG. 14.

Once more, concentration in B is plotted along the abscissa and temperature T is plotted up the ordinate. As in FIG. 13, there are marked the temperature values $T_1$ and $T_2$, and also the oblique lines $l_1$ to $l_6$ relating to variation of B in the composition in each branch $B_1(1)$ to $B_6(1)$.

Under such conditions, any suitable means are used for detecting the appearance of different phases, such as spatial arrangements (micellar phases, lamellar phases, cubic, hexagonal, or similar phases), surface tension systems, polymer systems, colloidal systems, etc. It is then possible to trace the various portions of the phase diagram in FIG. 14.

It should be emphasized that in the invention it is possible to apply a gradient to the operating conditions that is other than a temperature gradient. Mention can be made in particular but non-limiting manner of humidity, pressure, or even voltage.

Furthermore, the various above-explained examples make use of only two reagents. It should nevertheless be understood that the invention can be applied to a larger number of reagents, in particular to three or four reagents.

Furthermore, the various examples make use of entities that are dispersed, i.e. bubbles or drops, of composition that is measured in the various derived branches. However, in a variant, it should be emphasized that it is possible in accordance with the invention to cause a continuous stream to flow in the derived branches in order to analyze the composition thereof. It will be understood that such an implementation does not make use in particular of the microchannel 24 that serves to deliver the carrier phase.

The invention serves to achieve the above-mentioned objects.

It should firstly be emphasized that the Applicant has the merit of observing that the arrangement proposed by Ismagilov et al. is not very satisfactory insofar as it does not allow for a sufficiently long transit time for the reagents. In Ismagilov et al. transit time is limited by the length of the microchannel in which the reagents flow, it being recalled that it does not have any branches. Under such conditions, except by using a device of unreasonable size, transit time is relatively short, so that the corresponding study of reactions is incomplete.

In contrast, by using the invention, the transit time of the reagents can be particularly long, but without thereby unacceptably increasing the size of the device. In this respect, the presence of the various forks is particularly advantageous since it makes it possible to increase this transit time substantially, but without thereby requiring microchannels of great length.

It is emphasized that in accordance with the invention, the structure of the derived branches is such that the longest flow time to be found in the device increases much more rapidly than linearly with the total length of the branches, for constant section and inlet flow rate. Thus, in the various examples described and shown, transit times varies exponentially relative to the total length of the derived branches.

The asymmetrical nature of the device of the invention presents specific advantages. By making use of a small number of microchannels, it is possible to reduce its overall size, but without that reducing the possibilities made available by the device. Furthermore, by means of this arrangement, it is possible to recover reaction mixtures from the successive outlets $S_1$ to $S_6$ having compositions that are different, given that their transit times are not identical.

Making use of optical analyzer means, e.g. of the Raman, infrared, or indeed fluorescent type, is also advantageous. This makes it possible to avoid the device as a whole being subjected to excessive instrumentation.

A worked example of the invention is described below, purely by way of indication.

The device used was as described with reference to FIGS. 1 and 2. Two aqueous solutions respectively of $K_4Fe_{II}(CN)_6$ and of $K_3Fe_{III}(CN)_6$ were admitted at respective rates of 100 µL/h and 100 µL/h. Those two fluids are capable of diffusing into one another when they meet.

A carrier phase was also admitted, in the form of silicone oil, at a rate of 200 µL/h. Under those conditions, a succession of drops were formed, each being made up initially of 50% by volume of the $K_4Fe_{II}(CN)_6$ solution and 50% by volume of the $K_3Fe_{III}(CN)_6$ solution.

The mixing states of drops at different times in the channel were measured by Raman spectrography. Those measurements were performed in the section 36 of FIG. 1 and also at the outlets $B_1(1)$ to $B_1(6)$ in FIG. 2. Mixing was determined by measuring the concentrations of $K_4Fe_{II}(CN)_6$ and of $K_3Fe_{III}(CN)_6$ at different positions in the channel. Raman measurement has very good spatial resolution, thus making it possible to position the beam in a region within the channel that has an area of 5 square micrometers.

The values for the ratios of $K_4Fe_{II}(CN)_6$ concentration relative to $K_3Fe_{III}(CN)_6$ concentration at three successive positions along the channel 36 were as follows:

$K_4Fe_{II}(CN)_6/K_3Fe_{III}(CN)_6 = 7$
$K_4Fe_{II}(CN)_6/K_3Fe_{III}(CN)_6 = 1.6$
$K_4Fe_{II}(CN)_6/K_3Fe_{III}(CN)_6 = 1$

That experiment shows that mixing takes place quickly with a drop when the drop is forced to flow along a system with bends. The Raman detection method makes it possible to obtain information relating to the mobility, the diffusion, and also to the mixing of molecular species within microdrops. The drops are produced at kilohertz rates and they move at speeds of centimeter per second order.

It is assumed that the transit time $t_1$ of each drop at the outlet $S_1$ was 1 second (s). Under such conditions, the respective transit times for the other outlets $S_2$ to $S_6$ were:

$t_2$: 2.5 s
$t_3$: 5.5 s
$t_4$: 11.5 s
$t_5$: 23.5 s
$t_6$: 47.5 s

Raman spectrography was used to measure the various concentration ratios of $K_4Fe_{II}(CN)_6$ relative to $K_3Fe_{III}(CN)_6$, which ratios are written $R_1$ to $R_6$. The values for those concentration ratios were as follows:

$R_1$: 1
$R_2$: 1
$R_3$: 1
$R_4$: 1
$R_5$: 1
$R_6$: 1

A drop that is mixed within the region 36 of the microfluidic device having bends remains mixed all along the path.

The invention claimed is:

1. A microfluidic flow device for determining parameters of a physical and/or chemical transformation, which comprises
   a body (2),
   at least one flow microchannel (36) for transferring a mixture (G; T') of at least two components, this microchannel being formed within the body (2), the at least one flow microchannel (36) opening out into at least one fork ($D_1$-$D_6$; $D'_1$-$D'_6$; $D''_1$-$D''_n$; $d_1$-$d_n$; $d'_1$-$d'_n$) forming a tree structure having a plurality of forks ($D_1$-$D_6$; $D'_1$-$D'_6$; $D''_1$-$D''_n$; $d_1$-$d_n$; $d'_1$-$d'_n$), a plurality of derived branches ($B_1$-$B_6$; $B'_1$-$B'_6$; $B''_1$-$B''_n$; $b_1$-$b_n$; $b'_1$-$b'_n$), and a plurality of outlets ($S_1$-$S_5$; $S'_1$-$S'_5$; $S''_1$-$S''_{n-1}$; $s_1$-$s_{n-1}$; $s'_1$-$s'_{n-1}$), said plurality of derived branches comprising a plurality of divided branches ($B'_1(2)$-$B'_6(2)$) and a plurality of non-divided branches ($B_1(1)$-$B_5(1)$; $B'_1(1)$-$B'_5(1)$; $B''_1(1)$-$B''_{n-1}(1)$; $b_1(1)$-$b_{n-1}(1)$; $b'_1(1)$-$b'_{n-1}(1)$), the device also comprising introduction means for introducing said components into the at least one flow microchannel and forming means for forming said mixture, the forming means being arranged between the introduction means and the at least one fork, in which the at least one flow microchannel is divided into at least two derived branches of order 1 ($B_1$; $B'_1$; $B''_1$; $b_1$; $b'_1$), one of which divides into at least two derived branches of order 2 ($B_2$; $B'_2$; $B''_2$; $b_2$; $b'_2$), at least one derived branch of order n−1 being divided into at least two derived branches of order n, and for each order, with the exception of the order furthest downstream, two derived branches are provided, one of which ($B_1(1)$-$B_5(1)$; $B'_1(1)$-$B'_5(1)$; $B''_1(1)$-$B''_{n-1}(1)$; $b_1(1)$-$b_{n-1}(1)$; $b'_1(1)$-$b'_{n-1}(1)$) is a non-divided branch and is connected directly to an outlet ($S_1$-$S_5$; $S'_1$-$S'_5$; $S''_1$-$S''_{n-1}$; $s_1$-$s_{n-1}$; $s'_1$-$s'_{n-1}$), and the other of which ($B_1(2)$-$B_5(2)$; $B'_1(2)$-$B'_5(2)$; $B''_1(2)$-$B''_{n-1}(2)$; $b_1(2)$-$b_{n-1}(2)$; $b'_1(2)$-$b'_{n-1}(2)$) is a divided branch that is divided into two derived branches of immediately higher order ($B_2$-$B_6$; $B'_2$-$B'_6$; $B''_2$-$B''_n$; $b_2$-$b_n$; $b'_2$-$b'_n$).

2. The microfluidic flow device as defined by claim 1, wherein n is greater than or equal to 4.

3. The microfluidic flow device as defined by claim 1, wherein the length (L; L') of the non-divided branches ($B_1(1)$-$B_6(1)$; $B'_1(1)$-$B'_6(1)$) is twice the length (l; l') of the divided branches ($B_1(2)$-$B_6(2)$; $B'_1(2)$-$B'_6(2)$).

4. The microfluidic flow device as defined by claim 1, wherein the plurality of divided branches ($B'_1(2)$-$B'_6(2)$) are rectilinear and extend in line with one another.

5. The microfluidic flow device as defined by claim 1, wherein the plurality of outlets ($S''_1$-$S''_n$; $s'_1$-$s'_n$) are disposed mutually adjacent to one another.

6. The microfluidic flow device as defined by claim 1, wherein each divided branch ($b_1(2)$-$b_{n-1}(2)$) forms a same angle (α, β) of about 135° with both of the derived branches of immediately higher order ($b_2$-$b_n$) extending from said divided branch.

7. The microfluidic flow device as defined by claim 1, wherein the plurality of derived branches form a main channel (C) possessing meanders ($R_1$-$R_4$), and certain derived branches from a first meander extend in the vicinity of certain derived branches from an adjacent meander.

8. The microfluidic flow device as defined by claim 1, wherein the plurality of derived branches form a succession of a plurality of substantially identical patterns (M).

9. The microfluidic flow device as defined by claim 1, where at the vicinity of at least one fork ($d_1$), there is provided a link branch (BL) interconnecting the two derived branches ($b_1(1)$, $b_1(2)$) extending from said fork.

10. The microfluidic flow device as defined by claim 1, further including means (4, 6, 24; 4', 6'; 24') for creating dispersed entities (G; T'), said dispersed entities being formed by said mixture of said at least two components.

11. The microfluidic flow device as defined by claim 10, wherein the means for creating dispersed entities comprise at least two first microchannels (4, 6; 4', 6') for delivering said at least two components, together with an additional microchannel (24; 24') for delivering a fluid that is not miscible with said components and/or with a mixture thereof, wherein said additional microchannel communicates with said at least two first microchannels.

12. The microfluidic flow device as defined by claim 10, where at the vicinity of at least one fork ($d_1$), there is provided a link branch (BL) interconnecting two derived branches ($b_1(1)$, $b_1(2)$) extending from said fork, and wherein the means for creating dispersed entities are useful for generating a succession of drops (G) separated by segments (T) of a carrier phase, while the link branch (BL) presents transverse dimensions such as to permit the carrier phase to pass along said link branch while preventing the drops (G) from passing in said link branch.

13. The microfluidic flow device as defined by claim 12, wherein the link branch (BL) possesses two end portions ($BL_1$, $BL_2$) of small cross-section, together with a middle portion ($BL_3$) of a cross-section that is considerably greater than that of said end portions.

14. The microfluidic flow device as defined by claim 10, wherein the flow microchannel (36) is provided with means ($36_1$) for mixing reagents within each dispersed entity.

15. The microfluidic flow device as defined by claim 1, wherein the device is provided with analyzer means (240) for analyzing said mixture (G; T') of said at least two components.

16. The microfluidic flow device as defined by claim 15, wherein the analyzer means are a Raman analyzer (240), an infrared analyzer, or a fluorescence analyzer.

17. The microfluidic flow device as defined by claim 1, including means (250, 252) enabling a gradient to be imposed in at least one operating condition along at least one derived branch ($B_1$-$B_6$).

18. The microfluidic flow device as defined by claim 1, wherein the number of outlets is greater than the number of flow microchannels.

19. Operation of the microfluidic flow device comprising:
providing a microfluidic flow device for determining parameters of a physical and/or chemical transformation, which comprises a body, at least one flow microchannel for transferring a mixture (G; T') of at least two components, this microchannel being formed within the body, the at least one flow microchannel opening out into at least one fork ($D_1$-$D_6$; $D'_1$-$D'_6$; $D''_1$-$D''_n$; $d_1$-$d_n$; $d'_1$-$d'_n$) forming a tree structure having a plurality of forks ($D_1$-$D_6$; $D'_1$-$D'_6$; $D''_1$-$D''_n$; $d_1$-$d_n$; $d'_1$-$d'_n$), a plurality of derived branches ($B_1$-$B_6$; $B'_1$-$B'_6$; $B''_1$-$B''_n$; $b_1$-$b_n$; $b'_1$-$b'_n$), and a plurality of outlets ($S_1$-$S_5$; $S'_1$-$S'_5$; $S''_{n-1}$; $s_1$-$s_{n-1}$; $s'_1$-$s'_{n-1}$), said plurality of derived branches comprising a plurality of divided branches ($B'_1(2)$-$B'_6(2)$) and a plurality of non-divided branches ($B_1(1)$-$B_5(1)$; $B'_1(1)$-$B'_5(1)$; $B''_1(1)$-$B''_{n-1}(1)$; $b_1(1)$-$b_{n-1}(1)$; $b'_1(1)$-$b'_{n-1}(1)$), the device also comprising introduction means for introducing said components into the at least one flow microchannel and forming means for forming said mixture, the forming means being arranged between the introduction means and the at least one fork, in which the at least one microchannel divides into at least two derived branches of order 1 ($B_1$; $B'_1$; $B''_1$; $b_1$; $b'_1$), one of which divides into at least two derived branches of order 2 ($B_2$; $B'_2$; $B''_2$; $b_2$; $b'_2$), at least one derived branch of order n−1 being divided into at least two derived branches of order n, and for each order, with the exception of the order furthest downstream, two derived branches are provided, one of which ($B_1(1)$-$B_5(1)$; $B'_1(1)$-$B'_5(1)$; $B''_1(1)$-$B''_{n-1}(1)$; $b_1(1)$-$b_{n-1}(1)$; $b'_1(1)$-$b'_{n-1}(1)$) is a non-divided branch and is connected directly to an outlet ($S_1$-$S_5$; $S'_1$-$S'_5$; $S''_1$-$S''_{n-1}$; $s_1$-$s_{n-1}$; $s'_1$-$s'_{n-1}$), and the other of which ($B_1(2)$-$B_5(2)$; $B'_1(2)$-$B'_5(2)$; $B''_1(2)$-$B''_{n-1}(2)$; $b_1(2)$-$b_{n-1}(2)$; $b'_1(2)$-$b'_{n-1}(2)$) is a divided branch that is divided into two derived branches of immediately higher order ($B_2$-$B_6$; $B'_2$-$B'_6$; $B''_2$-$B''_n$; $b_2$-$b_n$; $b'_2$-$b'_n$);

introducing the at least two components into the introduction means;

forming said mixture (G; T') having a composition in the forming means;

causing said mixture to flow in the flow microchannel (36); and analyzing said mixture in at least one derived branch ($B_1$-$B_6$).

20. Operation of the microfluidic flow device as defined by claim 19, wherein the analyzing is performed on said mixture (G; T') in derived branches of different orders ($B_1$-$B_6$).

21. Operation of the microfluidic flow device as defined by claim 19 wherein the composition of said mixture is analyzed.

22. Operation of the microfluidic flow device as defined by claim 19, wherein a mixture (G; T') that has an unvarying initial composition is caused to flow.

23. Operation of the microfluidic flow device as defined by claim 21, wherein the analyzing step is for deducing rate parameters for transformation that takes place between said at least two components for deducing a rate constant ($k_c$).

24. Operation of the microfluidic flow device as defined by claim 19, wherein the composition of said mixture (G; T') is modified.

25. Operation of the microfluidic flow device as defined by claim 19, wherein a gradient of at least one operating condition is applied in a plurality of derived branches of different orders ($B_1(1)$-$B_6(1)$).

26. Operation of the microfluidic flow device as defined by claim 25, further comprising detecting the appearance of crystals or of different spatial arrangements in the derived branches ($B_1(1)$-$B_5(1)$) that are subjected to said gradient of at least one operating condition.

27. Operation of the microfluidic flow device as defined by claim 26, wherein said detecting step deduces a solubility diagram or a phase diagram.

28. Operation of the microfluidic flow device as defined by claim 19, wherein said mixture is caused to flow in the form of a succession of said dispersed entities (G; T').

29. Operation of the microfluidic flow device as defined by claim 28, wherein the dispersed entities are drops (G) distributed in a carrier phase (T).

30. Operation of the microfluidic flow device as defined by claim 28, wherein the dispersed entities are segments (T') of a carrier phase separated by drops (G').

31. Operation of the microfluidic flow device as defined by claim 28, wherein a succession of drops (G) and of segments (T) of a carrier phase is caused to flow in the vicinity of said fork ($d_1$) and of a link branch (BL); the distance (L) between the fork ($d_1$) and the link branch (BL), the length ($l_g$) of a drop (G), and the length ($l_t$) of said segment (T) of carrier phase being such that:

$$(l_g + l_t)/2 \leq L \leq l_g + l_t.$$

* * * * *